Aug. 29, 1950          G. R. PHILLIPS          2,520,372
HIGH-PRESSURE HOSE FITTING AND COUPLING
Filed May 18, 1946          2 Sheets-Sheet 2
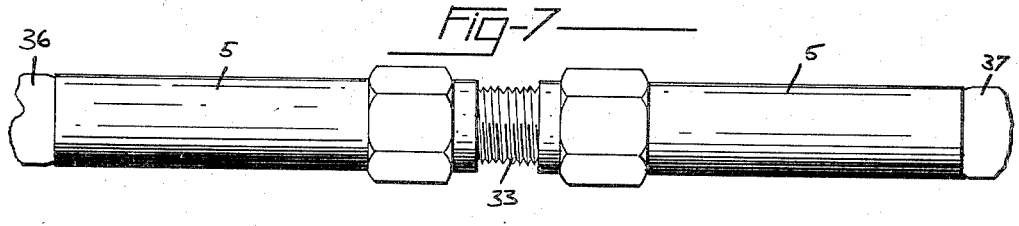
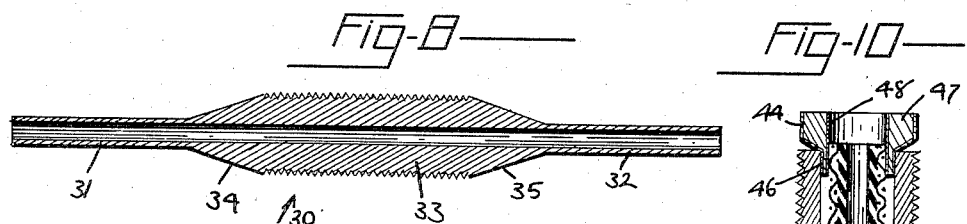
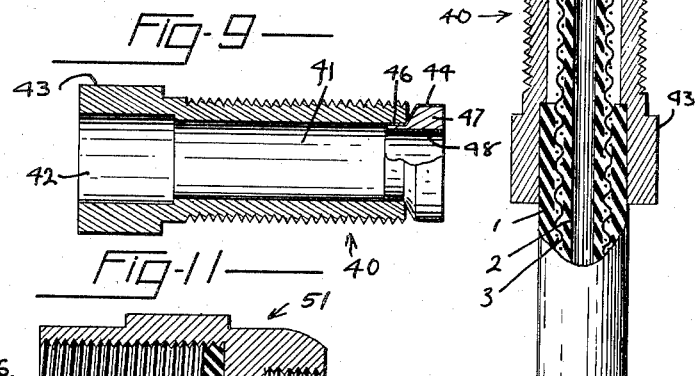
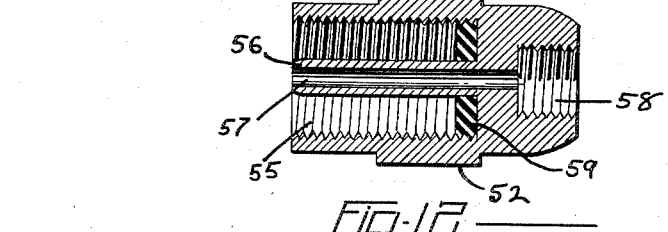
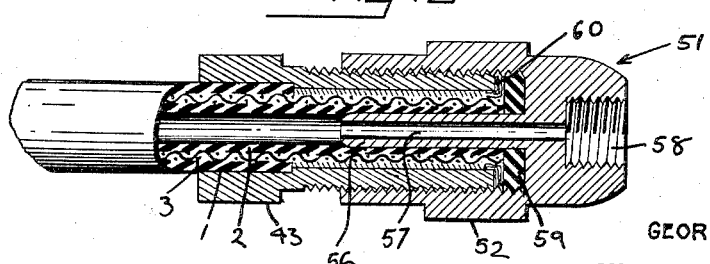
INVENTOR.
GEORGE R. PHILLIPS
BY
Boyken, Mohler & Beckley
ATTORNEYS Patented Aug. 29, 1950

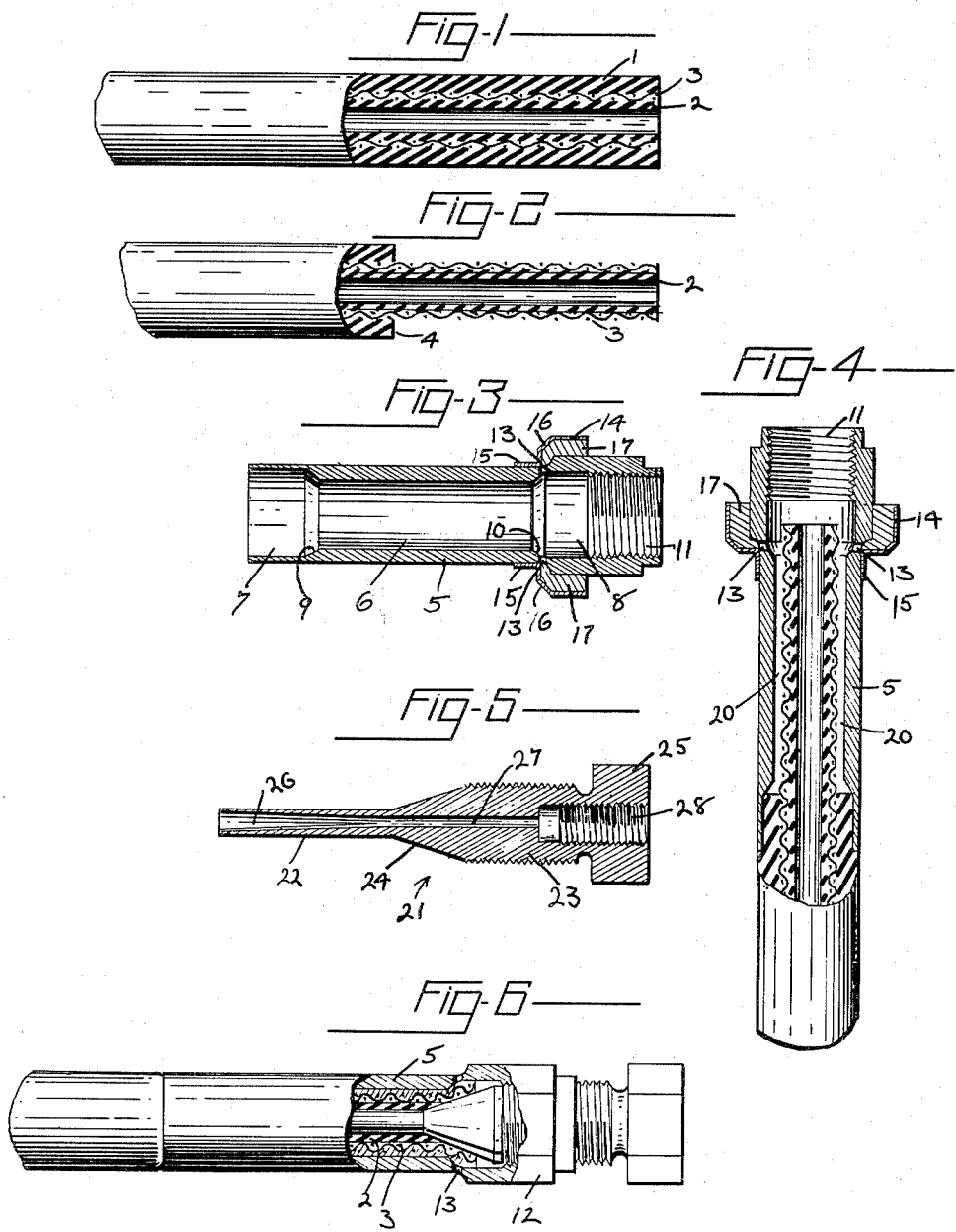

2,520,372

UNITED STATES PATENT OFFICE 2,520,372

HIGH-PRESSURE HOSE FITTING AND COUPLING

George R. Phillips, Sacramento, Calif.

Application May 18, 1946, Serial No. 670,690

5 Claims. (Cl. 285—74)

1

This invention relates to a high pressure hose fitting and coupling and has for one of its objects the provision of an improved method of securing such fitting and coupling on a high pressure hose of the type having reinforcing wires imbedded therein. Such wires are generally woven, and the hose material is rubber or one of the synthetic rubbers, according to the purpose for which the hose is to be used and the availability of the material.

Heretofore it has been the practice to clamp the fittings onto the ends of the hose, which fittings generally also function as couplings for connecting one length of hose with another or for securement of a length of hose to a pump, nozzle, grease gun, etc. The process of clamping the fittings onto a length of hose has heretofore been a factory job almost exclusively. When, through ordinary wear or accident, the users have found it necessary to have fittings or coupling elements re-clamped to a hose, they have almost invariably been compelled to return the hose to the factory to have the job done; and almost without exception, the re-clamped job is not satisfactory due to deterioration in the rubber or synthetic rubber. Usually the rubber or synthetic rubber lining is satisfactory. Also, the woven wire reinforcing is as good as ever, but the exterior of the outer layer is not in as good condition as before, and since the conventional clamping job goes over the outer layer, the same degree of securement for the fitting or coupling does not exist.

The result of the foregoing is that most shops and service stations have many lengths of expensive high pressure hose without fittings or couplings which they are keeping for possible use in the future; although the possibility of such use is remote.

The principal object of the present invention is the provision of a fitting or coupling for a high pressure hose that any shop worker or service man can quickly secure on the end of a high pressure hose, and which fitting or coupling will not become loose upon wear and disintegration of the outer or inner layer of the hose, but will remain in fluid-tight securement on the hose for an indefinite length of time.

Another object of the invention is a pressure hose having a fitting or coupling secured thereto

2 in a manner that makes it practically impossible for the fitting or coupling to become loose or to leak or to break away from the hose even under the most severe use and abuse.

Other objects and advantages will appear in the description and in the drawings.

In the drawings, Figure 1 is a part sectional, part elevational view of the end of a conventional, high pressure hose, such as used for conducting fluids or grease under high pressure.

Figure 2 is a part sectional, part elevational view of the end of a conventional high pressure hose of the type shown in Figure 1, with the outer layer of rubber stripped off the woven wire reinforcing for a predetermined distance to expose said reinforcement for preparing the hose for securement of my fitting or coupling thereto.

Figure 3 is a sectional view taken through one of the assembled elements of the fitting to be secured on the hose of Figure 2.

Figure 4 is a sectional view showing the end of a hose, such as seen in Figure 2, with the device of Figure 3, thereon preparatory to effecting securement between said device and hose.

Figure 5 is a sectional view through a clamping element to be used with the device of Figure 3 after the later has been secured on the end of a hose.

Figure 6 is a part sectional and part elevational view showing the complete fitting secured on the end of the hose.

Figure 7 is an elevational view of a coupling embodying the present invention, in position securing two lengths of hose together.

Figure 8 is a sectional view through one element of the coupling of Figure 7.

Figure 9 is a sectional view through an element of a modified form of fitting.

Figure 10 is a part sectional, part elevational view of the end of a length of hose showing the element of Figure 9 thereon preparatory to securing said device thereto.

Figure 11 is a sectional view of a clamping element adapted to be used with the device of Figure 9.

Figure 12 is a part sectional, part elevational view of one end of a hose with the complete fitting of Figures 9 and 11 secured thereon.

In the description and claims, the word "fitting" is intended to include any device for securement to the end of a hose irrespective of whether such device is intended for securing the hose to another hose, or to a tank, pipe, nozzle, grease gun, or other object. Also the use of the word "rubber" is intended to include synthetic rubber or any of the plastic materials that may be used in place of rubber by reason of their more desirable characteristics or because of their greater cheapness or availability.

In detail, the conventional, high pressure hose comprises a body of rubber having reinforcing wires imbedded therein, generally in the form of woven or interlaced wires. As seen in Figure 1, said body comprises an outer layer 1 and an inner layer 2 of rubber, with the wires 3 imbedded between them.

The outer layer 1 is stripped away from the wires 3 for a predetermined distance providing a shoulder 4 in said outer layer (Figure 2). Thus, the wires 3 are exteriorly exposed for said predetermined distance.

The exterior portion or element of one form of the fitting of this invention comprises an open-ended, straight tubular member 5 (Figure 3), having a main central bore 6 and a counterbore 7 at one end and a counterbore 8 at the other end. A shoulder 9 is at the juncture between counterbore 7 and bore 6, while shoulder 10 is at the juncture between bore 6 and counterbore 8. The counterbore 8 is internally threaded at the end of the member 5, as indicated at 11, and the external portion of member 5 around the counterbore 8 is preferably of hexagonal contour for engagement by a wrench as seen at 12 in Figure 6.

The length of the exposed portion of wires 3 is such that upon insertion of the stripped end portion of the hose into the member 5 through the end of the latter in which counterbore 7 is formed, the end of the said portion will terminate slightly beyond the shoulder 10 and will project into counterbore 8 when the shoulder 4 on the hose engages the shoulder 9 that is at the juncture between bore 6 and counterbore 7 (Figure 4).

The member 5 is formed with several openings 13 in its sides substantially at the shoulder 10, or adjacent the hexagonal portion 12 (Figures 3 and 4).

Carried by member 5 in encircling relation thereto is an annular sleeve 14 (Figures 3 and 4) which may be of quite thin metal. The sleeve 14 is held in spaced co-axial relation to member 5 by a flange 15 formed at one end of the sleeve, which flange tightly engages the member 5 adjacent to the openings 13, the latter being in practically adjoining relation to the base 16 that connects sleeve 14 with flange 15. The sleeve 14 extends across said openings in direction toward the adjacent end of member 5, and said sleeve and its base 16 co-act with the member 5 to form an annular cup around the latter that is filled with solder 17 or the like.

In securing the member 5 on the end of the hose, the stripped end portion of the latter is inserted through counterbore 7 and into bore 6 until shoulders 4 and 9, respectively, on the hose and on member 5 are in engagement with each other. In this position, the said stripped end portion is co-axial within the member 5 and there is a space 20 between the exposed outer sides of the wire reinforcement 3 and the sides of bore 5. A small portion of outer layer 1 of the hose tightly fits in the counterbore 7.

The bore 6 has been previously tinned so that any molten solder flowing into said bore will bond with the member 5 if the temperature of the walls of bore 6 is substantially at least that of the melting point of the solder.

The hose and member 4 are then positioned vertically with the end carrying the solder 14 uppermost, as seen in Figure 4 and heat from any desired source, such as a gasoline or alcohol blow torch, is applied to the walls of the member 5 around bore 6. As soon as the end of the member 5 carrying the solder reaches the melting point of the latter, the solder melts and flows through openings 13 into space 20 filling the latter. This molten solder inseparably bonds with the walls of bore 6 and flows into the interstices between wires 3, so that upon cooling, the hose is practically inseparably secured to the member 5.

The amount of solder 14 held by the sleeve 15 is such that it will fill space 20 to about the level of openings 13.

The molten solder and the heat from the member 5 does not appear to have any detrimental effect on the inner layer of rubber 2 or upon the rubber at shoulder 4 that is at the lower end of said space 20. There is a momentary burning of a negligible amount of rubber, but the solder rapidly cools to a degree where it is harmless, in so far as the rubber is concerned.

The clamping element, generally designated 21, and seen in Figure 6, is next secured in position.

This element 21 is formed with a tubular end portion 22 that has an external diameter substantially equal to the internal diameter of the hose.

Adjoining one end of portion 22 is an enlarged part 23 concentric therewith, and a tapered exterior shoulder 24 is at the juncture between the portion 22 and part 23. The part 23 is exteriorly threaded for engagement with the threads 11 in counterbore 8, while the end of part 23 that is opposite the portion 22 terminates in an enlarged nut 25. Thus, the portion 22, part 23 and nut 25 are an integral unit forming the element 21.

The element 21 is formed with a through bore. The portion 26 of said bore extends through the portion 22, and the walls of said portion 26 are slightly convergent from the outer free end of said portion 22 to a point about even with shoulder 24. Then the bore continues straight in the part 23, as at 27, and opens into an internally threaded counter bore 28, that extends through nut 25. This threaded portion is adapted to engage any standard fitting, and may be of any desired diameter, or may have threads, grooves or slots of any kind therein instead of threads if the fitting or element intended to be engaged thereby requires it.

The element 21 is secured to member 5 by inserting the end portion 22 of said element into the end of the hose that is in member 5 (Figure 6), the sleeve 14 and its base and flange having been previously torn from member 5 after the solder 17 has flowed into space 20. Upon engagement of the threads on element 21 with threads 11 in counterbore 8 and upon further rotation of said element 21, the shoulder 24 on the element will engage the end of the hose that projects into the counterbore 8 and will expand said projecting end and tightly clamp it between shoulders 10 and 24 and over the solder 14 that is in space 20.

The fitting is substantially inseparably secured on the hose after the element 21 is screwed into the member 5 as above described, and no leakage at the fitting or loosening of the latter will occur under the most severe use and abuse of the hose for a period of time long in excess of that in which such leakage and loosening has hereto occurred. Usually the hose is worn out beyond repair before there is any leakage or weakening at the fitting.

In the event one hose is to be connected with another, the element, generally designated 30 (Figure 8) is used instead of the element 21. The hose lengths to be connected each have a member 5 secured thereto. The element 30 has similar tubular portions 31 and 32 at opposite ends thereof, and an externally threaded enlargement 33 connects said portions, while tapered shoulders 34 and 35, each identical with shoulder 24 on element 21, is at the junctures between the end portions 31 and 32, and said enlargement 33. Thus the shoulders 34 and 35 function to clamp the terminating ends of hose lengths 36 and 37 (Figure 7) against the shoulders 13 of members 5 when the members 5 are screwed onto the enlargement 33 from opposite ends of the latter.

The form of the invention as illustrated in Figures 9 to 12 is slightly different from that shown in the preceding views, although the hose is stripped back in substantially the same manner.

A tubular member 40 (corresponding broadly with member 5) is formed with a main bore 41 and a counterbore 42 at one end only of said main bore. The member 40 is formed around the portion in which counterbore 42 is positioned with a hexagonal nut 43 for engagement with a wrench. The rest of the member 40 is externally threaded, or at least a substantial portion thereof commencing from the end opposite counterbore 41.

An annular holder 44 that is substantially like the sleeve 14 and its flange, is secured on the end of the member 40 that is opposite the counterbore 42. This member 44 has a flange 46 that is adapted to fit inside the bore 41, and a body of solder 47 is carried within member 44. An inner flat, supporting ring 48, may be supported against the inner side of the solder 47, but this is not absolutely essential.

The inner sides of bore 41 are tinned, and when the member 40 is supported vertical, as seen in Figure 10, with the stripped end of the hose projecting into the same co-axially therewith, the exposed outer sides of the wires 3 are spaced from the walls of bore 41 as indicated at 50 in Figure 10. Also the terminating end of hose 5 extends into the ring 48 and slightly beyond the outer end of member 40.

Upon heating the member 40 around bore 41 until there is sufficient heat conducted to the solder 47 to melt the latter, whereupon the solder will flow into space 50, substantially filling it. The holder 44 may then be torn from the member 40 and the latter is ready for the clamping element generally designated 51 (Figure 11).

This clamping element 51 is tubular and is formed with a nut 52 on its outer sides for turning.

Formed in one end of the element 41 is an enlarged, interiorly threaded, annular recess 55 that extends around a central tubular portion 56 extending from the base of said recess and co-axial therewith.

The tubular portion 56 has a through bore 57 that extends through element 51 and terminates in an interiorly threaded counterbore 58 at the side of element 51 that is opposite recess 55.

A washer 59 is preferably secured in recess 55 against the base thereof.

In assembling element 51 with member 40, the tubular portion 56 is inserted into the end of the hose, and the threads in recess 55 will engage with the external threads on member 40 for tightening the element 51 on said member. Upon so tightening the element 51 on member 40, the projecting ends 60 (Figure 12) of wires 3 will engage the washer 59 and will be forced laterally into the space between the said washer and the end edges of member 40, thus tightly clamping the end of the hose to member 40.

The threaded counterbore 58 corresponds with the threaded counterbore 28 in element 21 and is for the same purpose, and if desired, the element 51 may be double ended to provide a coupling in generally the same manner as described for the coupling of Figures 7 and 8.

It is to be understood that the detailed description and drawings are not intended to be restrictive of the invention, but instead, they are merely illustrative of preferred forms.

I claim:

1. In a high pressure hose having interlaced reinforcing wires imbedded therein, an open-ended metal tubular fitting, the said wire reinforcement at one end of said hose being externally exposed, said end being positioned within said fitting co-axial therewith and spaced from the walls of said fitting, a metal binder in the space between said end and said fitting inseparably bonded with said fitting and extending into the interstices between said wires.

2. In a high pressure hose having interlaced reinforcing wires imbedded therein, an open-ended metal tubular fitting, the said wire reinforcement at one end of said hose being externally exposed, said end being positioned within said fitting co-axial therewith and spaced from the walls of said fitting, a metal binder in the space between said end and said fitting inseparably bonded with said fitting and extending into the interstices between said wires, and a unitary clamping element removably secured to said fitting clamping said wires to said fitting adjacent said binder.

3. In a high pressure hose having interlaced reinforcing wires imbedded therein, an open-ended metal tubular fitting, the said wire reinforcement at one end of said hose being externally exposed, said end being positioned within said fitting co-axial therewith and spaced from the walls of said fitting, a metal binder in the space between said end and said fitting inseparably bonded with said fitting and extending into the interstices between said wires, said exposed wires projecting slightly beyond said binder at their free ends, and means removably secured to said fitting for flaring the projecting ends of said wires radially outwardly against said fitting whereby said ends will be clamped between said means and said fitting.

4. In a high pressure hose having interlaced reinforcing wires imbedded therein, an open-ended metal tubular fitting, the said wire reinforcement at one end of said hose being externally exposed, said end being positioned within said fitting co-axial therewith and spaced from the walls of said fitting, a metal binder in the space between said end and said fitting inseparably bonded with said fitting and extending into the interstices between said wires, said hose being of rubber-like material, and said material covering the radially inner sides of said wires at said one end whereby fluid passing through said hose will not pass through the said interstices.

5. In a high pressure hose having interlaced reinforcing wires imbedded therein, an open-ended metal tubular fitting, the said wire reinforcement at one end of said hose being externally exposed, said end being positioned within said fitting co-axial therewith and spaced from the walls of said fitting, a metal binder in the space between said end and said fitting inseparably bonded with said fitting and extending into the interstices between said wires, a tube extending into said one end of said hose formed with tapered sides adapted to engage said hose at said one end for forcing the hose at said point of engagement outwardly against said member, and said tube being in threaded engagement with said member for tightening said sides against said hose.

GEORGE R. PHILLIPS.

REFERENCES CITED

The following references are of record in the file of this patent:

UNITED STATES PATENTS

| Number | Name | Date |
|---|---|---|
| 533,737 | Phelan | Feb. 5, 1895 |
| 615,976 | Felsche | Dec. 13, 1898 |
| 1,738,915 | Mueller | Dec. 10, 1929 |
| 1,890,998 | Lindquist | Dec. 13, 1932 |
| 1,924,712 | Eisenman | Aug. 29, 1933 |
| 2,399,103 | Clinedinst | Apr. 23, 1946 |